US 9,413,922 B2

United States Patent
Song et al.

(10) Patent No.: US 9,413,922 B2
(45) Date of Patent: Aug. 9, 2016

(54) PHOTOGRAPHING APPARATUS AND METHOD FOR SYNTHESIZING IMAGES

(71) Applicant: SAMSUNG ELECTRONICS CO., LTD., Suwon-si, Gyeonggi-do (KR)

(72) Inventors: Won-seok Song, Anyang-si (KR); Tae-hoon Kang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 14/036,344

(22) Filed: Sep. 25, 2013

(65) Prior Publication Data

US 2014/0098259 A1     Apr. 10, 2014

(30) Foreign Application Priority Data

Oct. 9, 2012  (KR) .................. 10-2012-0112022

(51) Int. Cl.
*H04N 1/21* (2006.01)
*G06T 5/50* (2006.01)
(Continued)

(52) U.S. Cl.
CPC .............. *H04N 1/2116* (2013.01); *G06T 5/50* (2013.01); *G06T 11/60* (2013.01); *H04N 1/387* (2013.01);
(Continued)

(58) Field of Classification Search
CPC ... H04N 5/2355; H04N 5/2356; H04N 5/262; H04N 5/2621; H04N 5/2625; H04N 5/265; H04N 5/272; H04N 2005/2726; H04N 1/2145; H04N 1/215; H04N 1/2116; H04N 1/3871; H04N 1/3876; G06T 5/50; G06T 2207/20092; G06T 2207/20104
See application file for complete search history.

(56) References Cited

U.S. PATENT DOCUMENTS

| | | | |
|---|---|---|---|
| 7,391,929 B2 | 6/2008 | Edwards et al. | |
| 7,646,415 B2 * | 1/2010 | Sugimoto | G03B 17/20 348/223.1 |

(Continued)

FOREIGN PATENT DOCUMENTS

| | | |
|---|---|---|
| EP | 2 533 520 A2 | 12/2012 |
| JP | 2006279440 A * | 10/2006 |

(Continued)

OTHER PUBLICATIONS

Fujita et al., "A Study on the Effect of ROI Masks on Face Recognition System Using Digital Recorder," 2006 IEEE International Conference on Acoustics, Speech and Signal Processing, ICASSP 2006 Proceedings, Toulouse, France, May 14-19, 2006, Piscataway, NJ, USA, pp. II-365-II-368 (May 14, 2006).

(Continued)

*Primary Examiner* — John Villecco
(74) *Attorney, Agent, or Firm* — Drinker Biddle & Reath LLP

(57) ABSTRACT

A photographing apparatus for synthesizing a plurality of continuously captured images is provided. The photographing apparatus includes a photographing unit that captures a plurality of images by continuously photographing an object; an input unit that receives a selection of a reference image from the plurality of captured images and a modification section in the reference image; a display unit that displays the reference image; a controller that, when the modification section is selected in the reference image and an image for replacing the modification section is determined, generates a mask image based on the modification section and generates a final image by synthesizing the reference image and the image for replacing the modification section using the mask image; and a storage unit that stores a data file including information of the mask image, the plurality of captured images, and the final image.

14 Claims, 7 Drawing Sheets

(51) Int. Cl.
*H04N 5/272* (2006.01)
*G06T 11/60* (2006.01)
*H04N 1/387* (2006.01)
*G11B 20/10* (2006.01)
*H04N 5/232* (2006.01)

(52) U.S. Cl.
CPC ............ *H04N 5/272* (2013.01); *G06T 2200/24* (2013.01); *G06T 2207/10016* (2013.01); *G06T 2207/20092* (2013.01); *G06T 2207/30201* (2013.01); *G11B 20/10* (2013.01); *H04N 5/23229* (2013.01)

(56) References Cited

U.S. PATENT DOCUMENTS

| | | | |
|---|---|---|---|
| 7,864,198 B2 | 1/2011 | Moroto et al. | |
| 8,004,582 B2 | 8/2011 | Koutaki et al. | |
| 8,031,970 B2* | 10/2011 | Li | G06K 9/00597 382/173 |
| 2005/0129324 A1* | 6/2005 | Lemke | H04N 1/387 382/254 |
| 2005/0280717 A1* | 12/2005 | Sugimoto | H04N 1/32128 348/222.1 |
| 2008/0246777 A1* | 10/2008 | Swanson | H04N 5/2256 345/640 |
| 2008/0316327 A1* | 12/2008 | Steinberg | G06K 9/00248 348/222.1 |
| 2009/0066817 A1* | 3/2009 | Sakamaki | H04N 5/23219 348/239 |
| 2009/0309990 A1* | 12/2009 | Levoy | H04N 5/23212 348/222.1 |
| 2010/0157069 A1* | 6/2010 | Sakamaki | G06T 13/80 348/207.2 |
| 2010/0164976 A1 | 7/2010 | Choe et al. | |
| 2011/0013038 A1* | 1/2011 | Kim | G06K 9/00228 348/222.1 |
| 2011/0206282 A1* | 8/2011 | Aisaka | G06T 11/60 382/195 |
| 2011/0222793 A1 | 9/2011 | Ueda et al. | |
| 2013/0162856 A1* | 6/2013 | Song | G06F 3/04845 348/222.1 |
| 2013/0162876 A1* | 6/2013 | Song | H04N 5/23229 348/333.01 |
| 2013/0314604 A1* | 11/2013 | Tada | H04N 9/643 348/649 |
| 2014/0092260 A1* | 4/2014 | Escobedo | H04N 5/225 348/207.1 |
| 2014/0133779 A1* | 5/2014 | Funabashi | G06T 11/60 382/283 |
| 2014/0321703 A1* | 10/2014 | Inomata | G06T 11/60 382/103 |

FOREIGN PATENT DOCUMENTS

| | | | |
|---|---|---|---|
| JP | 2009141811 A | * | 6/2009 |
| JP | 2010-283412 A | | 12/2010 |
| JP | 2011077574 A | * | 4/2011 |

OTHER PUBLICATIONS

Zibreg, "HDR Camera Enabler allows HDR photography on iPhone 3GS and 3G," retrieved from internet website: http://www.geek.com/articles/mobile/hdr-camera-enabler-allows-hdr-photography-on-iphone-3gs-and-3g-201000916/, retrieved on Oct. 7, 2011, pp. 1-6 (Sep. 16, 2010).
Extended Search Report issued for EP 13184717.0 (Jan. 13, 2014).
Examination Report issued for EP 13184717.0 (Mar. 12, 2015).

* cited by examiner

PHOTOGRAPHING APPARATUS AND METHOD FOR SYNTHESIZING IMAGES

CROSS-REFERENCE TO RELAYED APPLICATIONS

This application claims the priority benefit under 35 U.S.C. §119(a) from Korean Patent Application No. 10-2012-0112022 filed on Oct. 9, 2012 in the Korean Intellectual Property Office, the entire disclosure of which is incorporated herein by reference.

BACKGROUND

1. Field

Various embodiments of the invention generally relate to a photographing apparatus and an image synthesizing method. More particularly, various embodiments relate to a photographing apparatus and an image synthesizing method for storing information of continuously captured images and mask images in a data file and synthesizing the images using the stored information.

2. Related Art

Due to advances in electronic technologies, a variety of photographing devices are available and frequently used to take still images or moving images according to the increasing leisure life.

However, it is not easy for a user to capture his/her satisfactory image using one shot when photographing a moving object or a plurality of stationary objects.

In this regard, recent photographing devices provide a continuous photographing function allowing the user to capture his/her intended image by taking a plurality of pictures within a short period of time. The photographing devices also provide an image synthesizing function for finding and attaching intended portions of the continuously captured pictures to another image.

However, since a conventional image synthesizing method stores only the synthesized final output image, the user cannot edit the output image by fetching the existing image and continuing the image synthesis, or returning to the previous synthesizing stage.

SUMMARY

Various embodiments of the invention may address the above-mentioned and other problems and disadvantages associated with the conventional arrangement, and the embodiments provide a photographing apparatus and an image synthesizing method for storing information of continuously captured images and mask images in a data file and synthesizing the images using the stored information.

According to an embodiment, a photographing apparatus includes a photographing unit that captures a plurality of images by continuously photographing an object; an input unit that receives a selection of a reference image from the plurality of captured images and a modification section in the reference image; a display unit that displays the reference image; a controller that, when the modification section is selected in the reference image and an image for replacing the modification section is determined, generates a mask image based on the modification section and generates a final image by synthesizing the reference image and the image for replacing the modification section using the mask image; and a storage unit that stores a data file including information of the mask image, the captured images, and the final image. The storage unit may store the captured images, the final image, and the data file in separate folders. When a modification request of the final image is received, the controller reads the data file to re-synthesize the reference image and the image for replacing the modification.

When the controller generates the mask image, the controller may perform image synthesis at least once, in which the controller sequentially applies the mask image to other images of the plurality of captured images according to an input command through the input unit, separates an image section corresponding to the modification section in the other images, synthesizes the separated image section and the modification section of the reference image, and displays the synthesized image. When a storing command is received, the controller may determine that an image finally displayed is the final image and stores the final image in the storage unit.

When an undo command is received during the image synthesis or while editing the final image, the controller may restore and display a previous image, which is an image displayed before the image synthesis was performed, using the mask image information stored in the data file. When the modification request is received, the controller may set the final image added to the data file as the reference image and provide an interface for selecting a modification section in the final image.

The data file may be divided into a header and a body, the body may store the plurality of captured images and the mask image, the header may store information of the plurality of captured images and the mask image, and when the final image is generated and added to the data file, the controller may change the information stored in the header. The mask image information may be mask image feature information stored in the header of the mask image stored in the body, and the mask image feature information may include masking section location and size information of the mask image. The storage unit may be a non-volatile memory.

According to another embodiment, an image synthesizing method includes capturing a plurality of images by continuously photographing an object; receiving a selection of a reference image from the plurality of captured images; displaying the reference image; when a modification section is selected in the reference image and an image for replacing the modification section is determined, synthesizing the reference image and the image for replacing the modification section using a mask image based on the modification section; storing a data file including information of the mask image and the plurality of captured images; and when a modification request for the final image is received, reading the data file to re-synthesize the reference image and the image for replacing the modification section.

The generating of the final image may include when the modification section is selected in the reference image, generating a mask image based on the modification section; performing image synthesis at least once by sequentially applying the mask image to other images of the captured images according to an input command, separating an image section corresponding to the modification section in the other images, synthesizing the separated image section and the modification section of the reference image, and displaying the synthesized image; and when a storing command is received, determining that an image finally displayed is the final image.

The image synthesizing method may further include when an undo command is received during the image synthesis or while editing the final image, restoring and displaying a previous image, which is an image displayed before the image synthesis was performed, using the mask image information stored in the data file. The image synthesizing method may further include when the modification request is received, setting the final image added to the data file as the reference image and providing an interface for selecting a modification section in the final image.

The data file may be divided into a header and a body, the body may store the plurality of captured images and the mask image, the header may store information of the plurality of captured images and the mask image, and when the final image is generated and added to the data file, the information stored in the header may be changed. The mask image information may include mask image feature information stored in the header of the mask image in the body, and the mask image feature information may include masking section location and size information of the mask image. The data file may be stored in a non-volatile memory.

As set forth above, according to various embodiments of the invention, the image synthesizing process can be continued using the final image and mask image information stored in the data file, and the final image can be edited, for example, by undoing the image synthesis.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
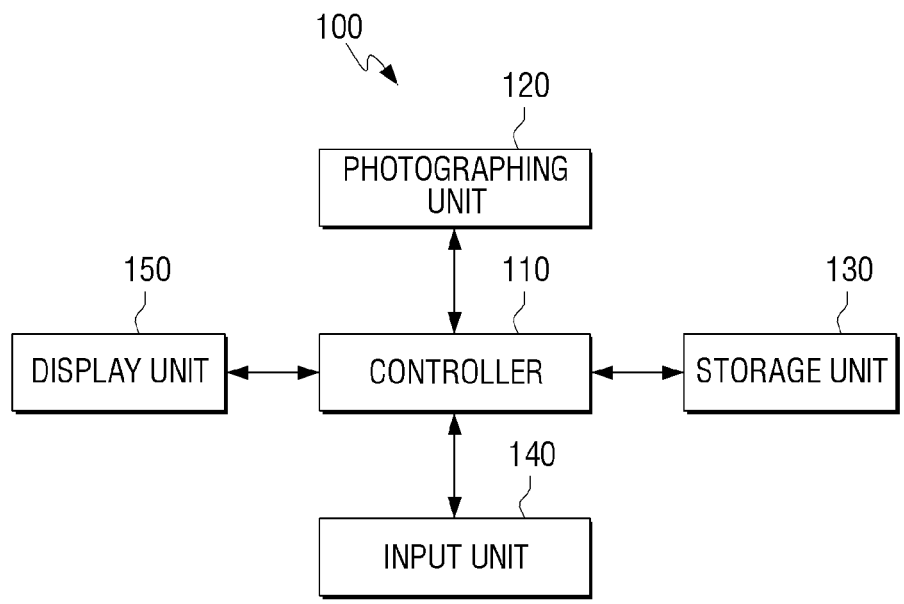
FIG. 1 is a block diagram of a photographing apparatus, according to an embodiment.

Reference will now be made in detail to the embodiments, examples of which are illustrated in the accompanying drawings, where like reference numerals refer to like elements throughout. The embodiments are described below with reference to the figures.

FIG. 1 is a block diagram of a photographing apparatus 100, according to an embodiment. The photographing apparatus 100 can be implemented using a digital still camera for taking a still image, a video camera for taking a moving picture, and various electronic devices such as mobile phone, game player, PDA, and PC having the same photographing function as the digital still camera or the video camera.

Referring to FIG. 1, the photographing apparatus 100 includes a controller 110, a photographing unit 120, a storage unit 130, an input unit 140, and a display unit 150.

The photographing unit 120 obtains an image by capturing an image of an object. In detail, the photographing unit 120 may include a lens (not shown) for forming an optical image in a photographing region by converging the light of the object, an imaging device for converting an incident light from the lens to an electric signal, and an AD converter (not shown) for converting an analog signal of the imaging device to a digital signal. The imaging device may use a Charge Coupled Device (CCD) imaging device or a Complementary Metal Oxide Semiconductor (CMOS) imaging device.

The storage unit 130 stores the image obtained by the photographing unit 120. The storage unit 130 may be an internal memory such as a HDD in the photographing apparatus 100, or an external memory such as memory stick or memory card. The storage unit 130 may include a volatile memory (e.g., DDR), and temporarily store a pixel value from the photographing unit 120 in the volatile memory for its fast processing.

The input unit 140 receives various user commands. When capturing the image, a user can set an image file format type and input a command relating to image resolution and digital zoom. When editing the captured image, the user can input a command for setting a region to modify in the captured image and pasting an intended section of another image into the region.

The input unit 140 may be implemented using a plurality of buttons of the photographing apparatus 100, or an input/output device such as a touch screen.

The display unit 150 displays various information about the photographing apparatus 100. The display unit 150 may display the optical signal coming from the lens in a live view, or display the image captured by the photographing unit 120. The user may edit, for example, synthesize the prestored images through the display unit 150.

The controller 110 controls operations of the photographing apparatus 100 according to user commands. In detail, when a photographing command is input through the input unit 140, the controller 110 may obtain image information of an object using the photographing unit 120 and store the obtained image information in the storage unit 130. Yet, it is not easy for the user to capture his/her intended image using a single shot. Accordingly, the controller 110 provides a continuous photographing function for capturing a plurality of images within a short period of time, and the user can then acquire his/her intended output image by synthesizing the images.

When the user captures images of the object using the continuous photographing function, the controller 110 stores the continuously captured image files and data files, in the storage unit 130.

Herein, the data file may include information of the continuously captured images and mask image information generated in the process of image synthesis.

Using the information of the continuously captured images and mask image information stored in the data file, the user can continue the image synthesis or return to the previous synthesizing stage.

An image synthesizing method using the plurality of the captures images will be described in detail by referring to FIGS. 5, 6 and 7.

Figure 2:
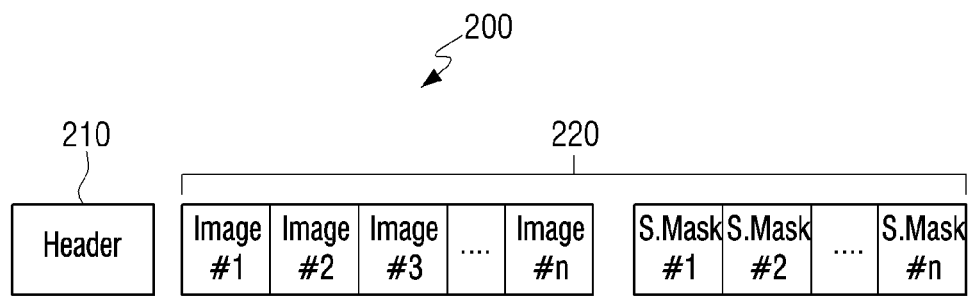
FIG. 2 is a detailed diagram of a data file, according to an embodiment.

FIG. 2 is a detailed diagram of a data file 200 generated by the controller 110 and stored in the storage unit 130, according to an embodiment.

The data file 200 includes a header 210 and a body 220.

The header 210 contains basic information of the data file 200, such as the number of captured images, image size, Frame Per Second (FPS), the number of mask images, and information of the synthesized images and the synthesizing section.

The body 220 contains the images captured by the photographing unit 120 and the mask image generated according to the user command. As shown, the body 220 may include a plurality of captured images and a plurality of mask images. A captured image can be stored as a JPG file or a RAW file.

While the RAW file increases the storage size, it does not go through JPG decoding using an internal algorithm operation and thus allows for faster processing. In some cases, the image can be resized and stored in accordance with the output image size.

The mask image stored in the data file will be described in detail by referring to FIG. 4.

Figure 3:
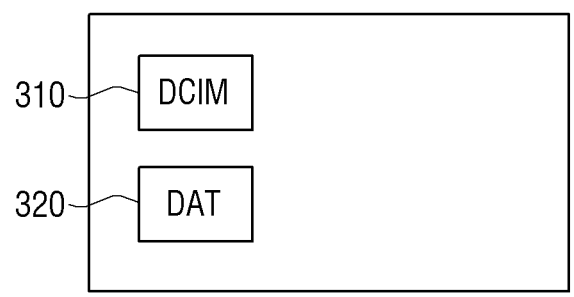
FIG. 3 is a diagram of storage locations of the data file, according to an embodiment.

FIG. 3 is a diagram of storage locations of the image file and the data file, according to an embodiment.

Since the photographing device according to related art stores only the continuously captured images and the final synthesized output image, it is necessary to select the image to be synthesized and the location of the image to be synthesized every time a new synthesized image is generated.

According to an embodiment, the continuously captured image is saved in an image folder 310, and the data file 200 is saved in a separate data folder 320.

Since the data file 200 is stored to an internal memory or an external memory being a non-volatile memory, the image synthesizing process can continue by fetching the synthesizing information, and the image synthesis process can also be undone (e.g., return to the previous image synthesizing stage) even when the system is rebooted.

Figure 4:
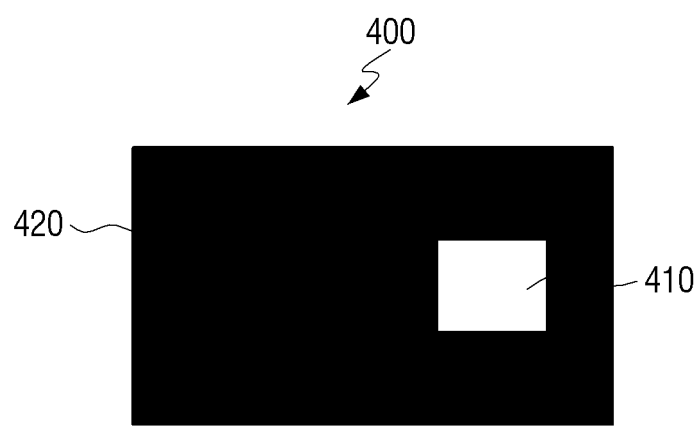
FIG. 4 is a diagram of a mask image, according to an embodiment.

FIG. 4 is a diagram of a mask image, according to an embodiment.

The mask image 400 is an image used to separate an intended portion of a particular image from the rest of the particular image and to synthesize the separated image portion with another image.

The mask image 400 is divided into a white region 410 and a black region 420. The white region 410 is transparent. When a particular image and the mask image 400 are synthesized, a portion of the particular image corresponding to the white region 410 of the mask is separated from the rest of the particular image.

The mask image 400, which is generated during the image synthesizing process, can be stored in the data file 200. The mask image 400 may be stored in the body 220 of the image file, or mask information (e.g., left top coordinate and size information of the mask image, and reference image information) rather than image type information, may be saved in the header 210.

When the mask information is recorded and stored in the header 210, when the mask image 400 is required, a new mask image can be generated using the mask information stored in the header 210.

Figure 5:
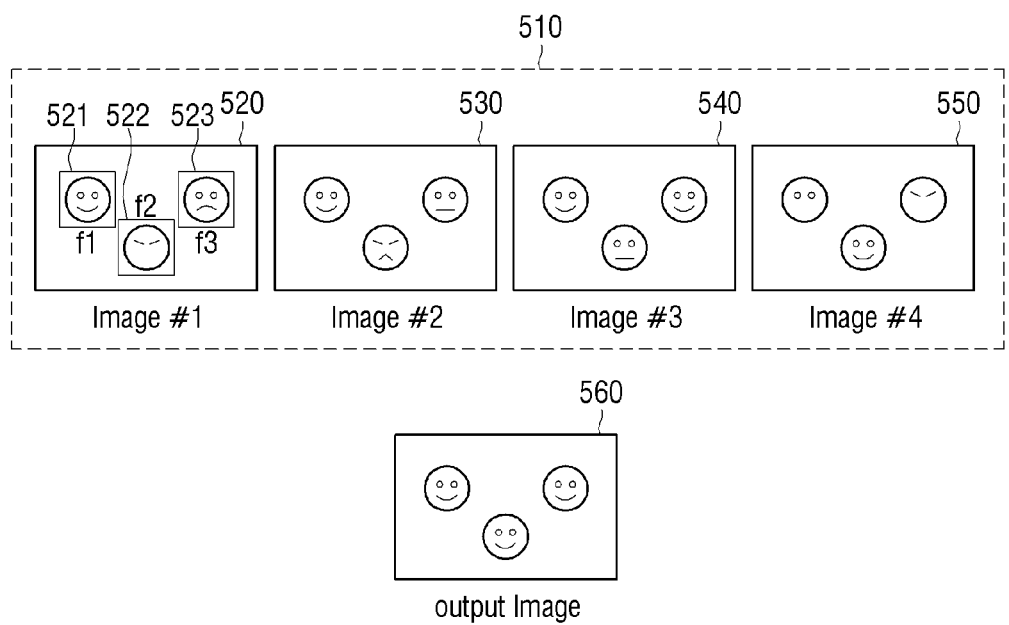
FIGS. 5, 6, and 7 are diagrams of an image synthesizing method, according to an embodiment.
Figure 6:
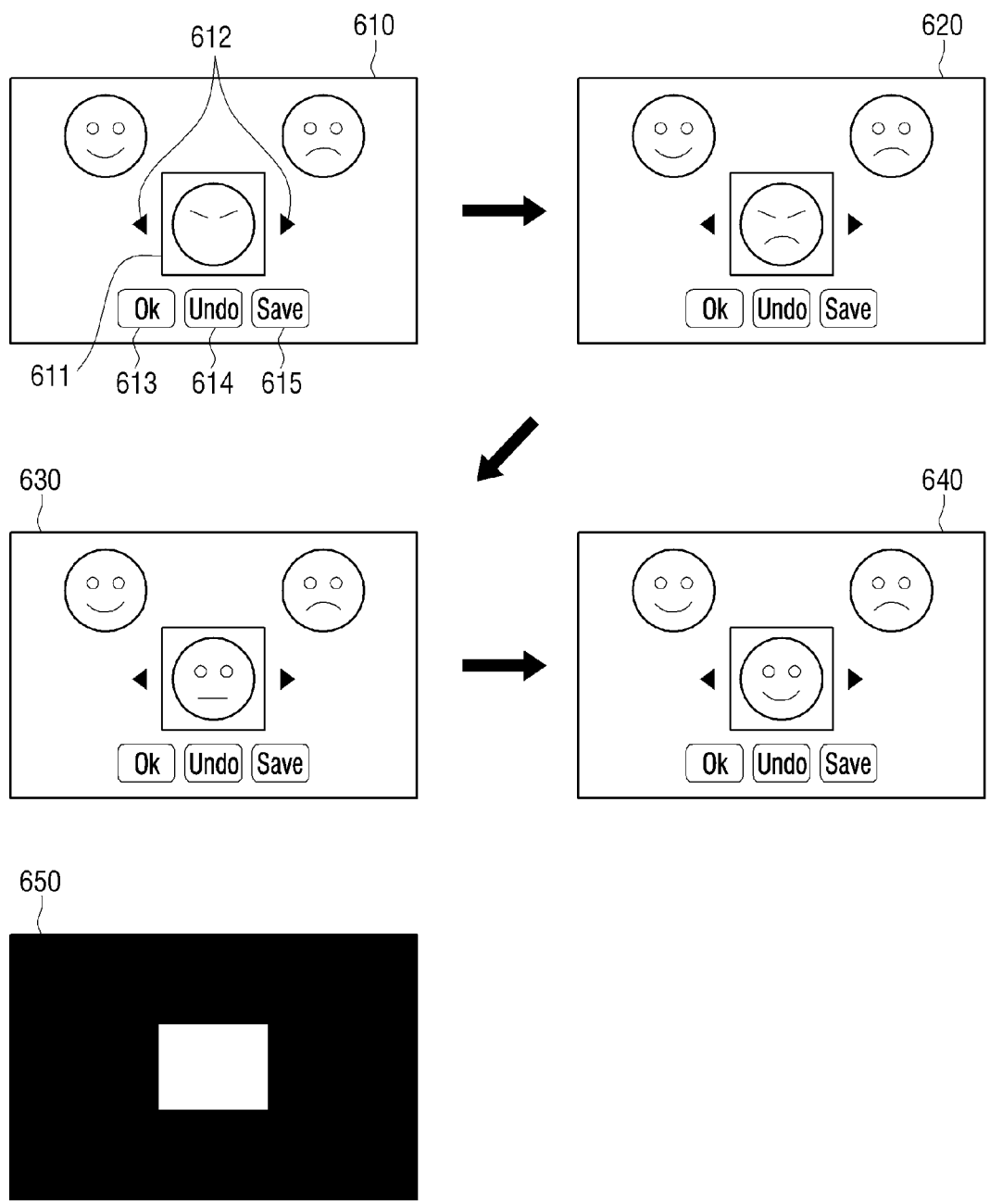
Figure 7:
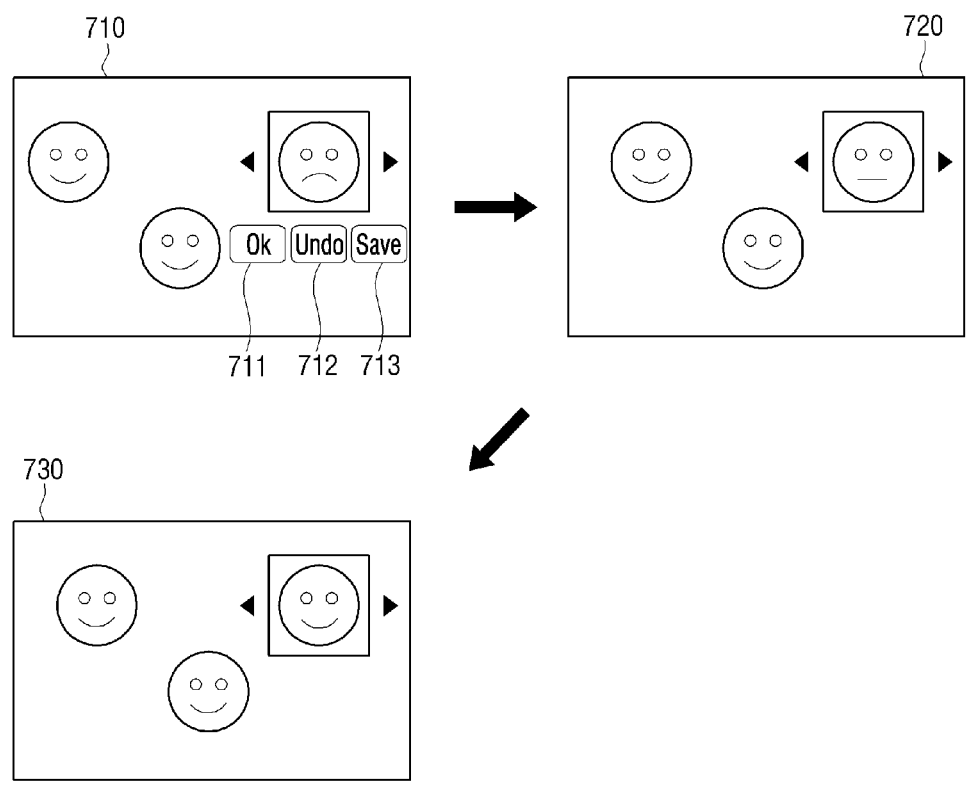

FIGS. 5, 6 and 7 are diagrams of an image synthesizing method, according to an embodiment.

In FIG. 5, image #1 520 through image #4 550 are images 510 continuously captured by the photographing apparatus according to a user command. In this embodiment, in a group photo including a plurality of objects, the user cannot obtain his/her satisfactory output image using only one shot.

Accordingly, the user tries to obtain the final output image by synthesizing his/her intended image portions in the continuously captured images 510. Herein, the user's intended final image is an output image 560. To generate the final output image 560 from the continuously captured images 510, using image #1 520 as a base image, a section f2 522 is replaced with the corresponding section of image #4 550 and a section f3 523 is replaced with the corresponding section of image #3 540. A section f1 521 in image #1 520 is not replaced.

FIG. 6 depicts the replacement of the section f2 522 of image #1 520 with the corresponding section of image #4 550.

The user selects a base image 610 from the continuously captured images 510 illustrated in FIG. 5. The base image 610 is an image which serves as the basic background for synthesizing a plurality of images. Hereafter, it is assumed that the base image 610 is image #1 520.

When the base image 610 is selected, the user sets a modification section 611 in the base image 610. The modification section 611 can be set using face detection, a mask pattern prestored in the storage unit 130, or the user's line drawing.

When the modification section 611 is defined, an editing window is displayed to swap the modification section 611 with a corresponding section in another image. The editing window includes modification buttons 612 for selecting the image to replace the modification section 611, an OK button 613 for confirming the image for replacing the modification section 611, an UNDO button 614 for undoing the image synthesis, and a SAVE button 615 for terminating the image synthesis and saving the final output image in the image folder 310.

Herein, by pressing the modification buttons 612, the user can sequentially identify the image sections of image #2 530 and image #3 540 corresponding to the modification section 611.

When the modification button 612 is pressed once in the base image 610, an image 620, in which the modification section 611 in the base image 610 is replaced with the corresponding section of the image #2 530, is displayed. Herein, when the modification button 612 is pressed more, an image 630 in which the modification section 611 is replaced with the corresponding section of image #3 540 and an image 640 in which the modification section 611 is replaced with the corresponding section of image #4 550 may be displayed.

To find and confirm an intended image for use in the modification section 611, the user may push the OK button 613. When the user pushes the OK button 613 (713 in FIG. 7) in the editing window, a mask image 650 corresponding to the modification section 611 may be generated and stored in the body 220 of the data file 200, and the synthesized image information may be stored in the header 210.

Instead of storing the mask image 650 corresponding to the modification section 611 in the body 220 of the data file 200, the mask information of the mask image 650 may be stored in the header 210, and the mask image 650 may be generated using the corresponding mask information if necessary.

In the image synthesizing process of FIG. 6, the user wants to synthesize image #4 550, where the object is smiling, in the modification section 611. Hence, when the user replaces the modification section 611 with the corresponding section of image #4 550 and pushes the OK button 613, the corresponding mask image 650 for image #4 550 and the synthesizing information may be saved in the header 210 of the data file 220.

Meanwhile, the mask information may be saved in the header 210 without saving the mask image 650 in the body 220, and the mask image 650 may be generated using the corresponding mask information if necessary.

FIG. 7 depicts a method for generating and storing the final image of the image synthesizing process in the image folder.

As mentioned earlier with respect to FIG. 5, when the f3 section 523 of image #1 520 is replaced with the corresponding section of image #3 540, a user's intended synthesized image 730 can be finally produced. Image 720 is an image where the f3 section 523 of image #1 520 is replaced with the corresponding section of the image #2 530, and is not the user's intended synthesized image.

When the user pushes the SAVE button 713 with no more section to modify in the base image 710, the final output is saved in the image folder 310 and the mask image or the mask information may be saved in the data file as aforementioned.

Meanwhile, by pushing the UNDO button 712, the process may return to the previous synthesizing stage, that is, to the synthesizing stage of the f2 section 522. When returning to the previous synthesizing stage, the mask information or the mask image and the synthesizing information saved in the data file 200 may be used.

That is, the mask location and size and the synthesized image information saved in the data file 200 can be used to return to the synthesizing stage of the f2 section 522.

Hence, the user can return to the previous synthesizing stage using the information saved in the data file 200, without having to repeat the former synthesizing process. Since the data file 200 is saved in the non-volatile memory, the editing and synthesis may be continued by fetching the information from the data file 200 even when the system is rebooted.

Figure 8:
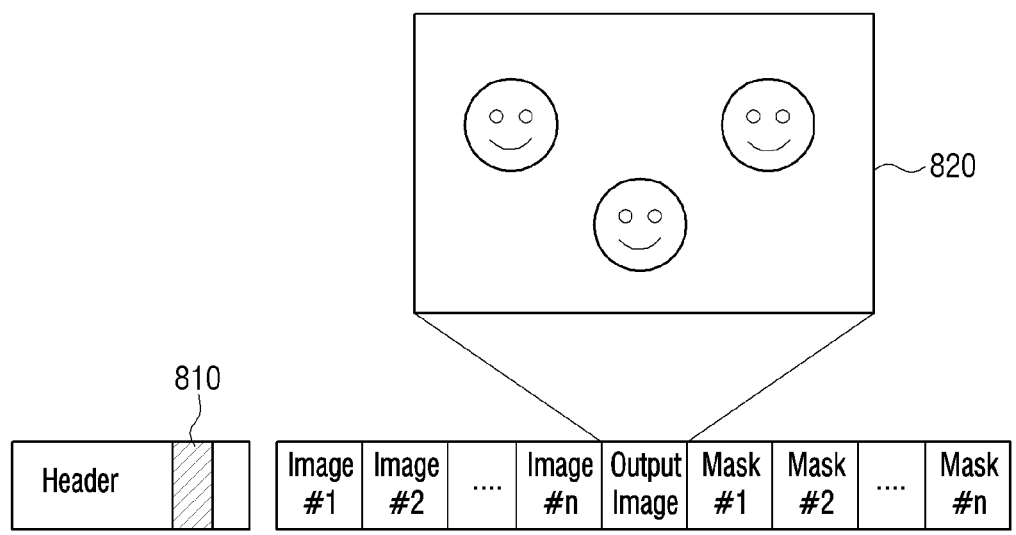
FIG. 8 is a diagram of a method for producing a new image and using the new image as the base image for image synthesis, according to an embodiment.

FIG. 8 is a diagram of a method for producing a new image and using the new image as the base image in the image synthesizing process, according to an embodiment.

A final output image 820 can be saved in the body 220 of the data file 200. In this case, output image information 810 can be added to the header 210. For example, if the number of original images is n, when an output image 820 generated through the image synthesizing process is added to the data file 200, the number of image files saved in the body 220 of the data file 200 is increased to n+1.

A new image may then be synthesized using the output image 820 as the base image.

Figure 9:
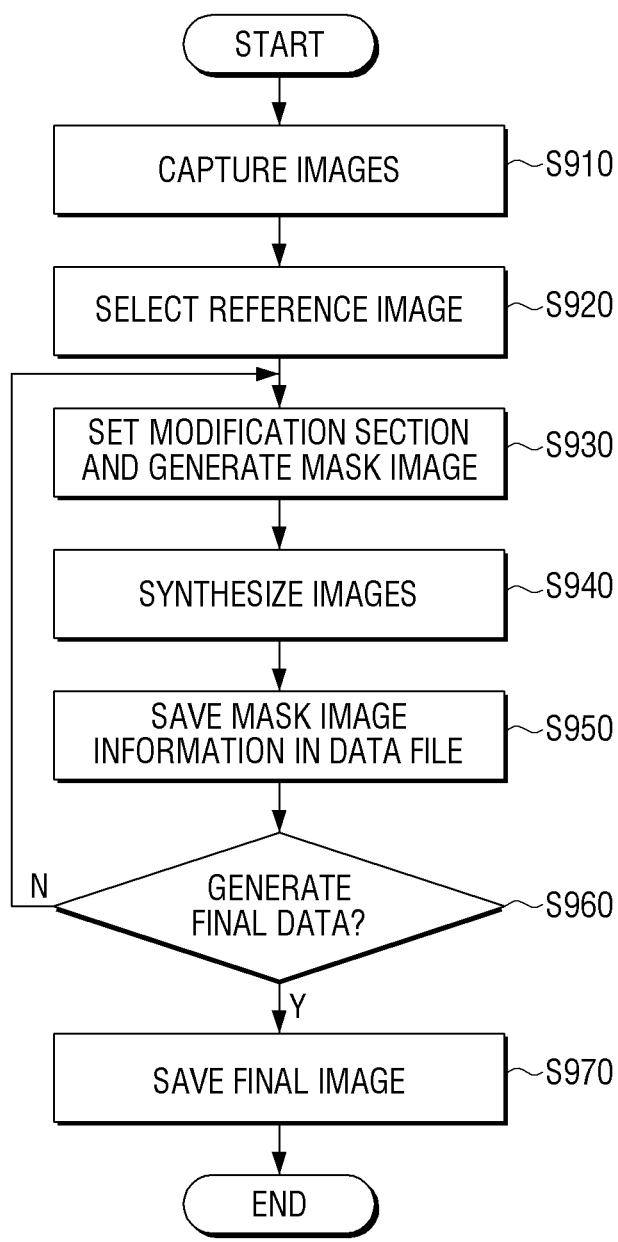
FIG. 9 is a flowchart of a method for synthesizing continuously captured images, according to an embodiment.

FIG. 9 is a flowchart of a method for synthesizing the continuously captured images, according to an embodiment.

The user captures the continuous images using the photographing apparatus 100 (S910) and selects a reference image as the background image for the image synthesizing process, from the captured images (S920).

When the user selects the section to modify in the reference image, the corresponding mask image is generated (S930) and used to synthesize the images (S940).

Meanwhile, when the image for replacing the modification section in the background image (reference image) is determined, the mask image and the synthesizing information are recorded in the data file 200 (S950). When the background image includes another modification section, the process is repeated. When the final image and data are generated (Y of S960), the final image is saved in the image folder (S970). If the final image and data are not to be generated (N of S960), the process returns to step S930.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Although a few embodiments of invention have been shown and described, it would be appreciated by those skilled in the art that changes may be made in these embodiments without departing from the principles and spirit of the invention, the scope of which is defined in the claims and their equivalents.

What is claimed is:

1. A photographing apparatus comprising:
   a photographing unit that captures a plurality of images by continuously photographing an object;
   an input unit that receives a selection of a reference image from the plurality of captured images and a modification section in the reference image;
   a display unit that displays the reference image;
   a controller that, when the modification section is selected in the reference image and an image for replacing the modification section is determined, generates a mask image based on the modification section and generates a final image by synthesizing the reference image and the image for replacing the modification section using the mask image; and
   a storage unit that stores a data file comprising information of the mask image, the plurality of captured images, and the final image,
   wherein the storage unit stores the plurality of captured images, the final image, and the data file in separate folders, and
   when a modification request of the final image is received, the controller reads the data file from the storage unit to re-synthesize the reference image and the image for replacing the modification section.

2. The photographing apparatus of claim 1, wherein, when the controller generates the mask image, the controller performs image synthesis at least once, in which the controller sequentially applies the mask image to other images of the plurality of captured images according to an input command through the input unit, separates an image section corresponding to the modification section in the other images, synthesizes the separated image section and the modification section of the reference image, and displays the synthesized image, and
   when a storing command is received through the input unit, the controller determines that an image finally displayed is the final image and stores the final image in the storage unit.

3. The photographing apparatus of claim 2, wherein, when an undo command is received during the image synthesis or while editing the final image, the controller restores and displays a previous image, which is an image displayed before the image synthesis was performed, using the mask image information stored in the data file.

4. The photographing apparatus of claim 1, wherein, when the modification request is received, the controller sets the final image added to the data file as the reference image and provides an interface for selecting a modification section in the final image.

5. The photographing apparatus of claim 1, wherein the data file is divided into a header and a body, the body stores the plurality of captured images and the mask image, and the header stores information of the plurality of captured images and the mask image, and
   when the final image is generated and added to the data file, the controller changes the information stored in the header.

6. The photographing apparatus of claim 5, wherein the mask image information comprises mask image feature information stored in the header of the mask image stored in the body, and
   the mask image feature information comprises masking section location and size information of the mask image.

7. The photographing apparatus of claim 1, wherein the storage unit is a non-volatile memory.

8. An image synthesizing method comprising:
   capturing a plurality of images by continuously photographing an object;
   receiving a selection of a reference image from the plurality of captured images;
   displaying the reference image;
   when a modification section is selected in the reference image and an image for replacing the modification section is determined, generating a final image by synthesizing the reference image and the image for replacing the modification section using a mask image based on the modification section;
   storing a data file comprising information of the mask image, the plurality of captured images, and the final image; and
   when a modification request for the final image is received, reading the data file to re-synthesize the reference image and the image for replacing the modification section.

9. The image synthesizing method of claim 8, wherein the generating of the final image comprises:
   when the modification section is selected in the reference image, generating a mask image based on the modification section;
   performing image synthesis at least once by sequentially applying the mask image to other images of the plurality of captured images according to an input command, separating an image section corresponding to the modification section in the other images, synthesizing the separated image section and the modification section of the reference image, and displaying the synthesized image; and
   when a storing command is received, determining that an image finally displayed is the final image.

10. The image synthesizing method of claim 9, further comprising:
when an undo command is received during the image synthesis or while editing the final image, restoring and displaying a previous image, which is an image displayed before the image synthesis was performed, using the mask image information stored in the data file.

11. The image synthesizing method of claim 8, further comprising:
when the modification request is received, setting the final image added to the data file as the reference image and providing an interface for selecting a modification section in the final image.

12. The image synthesizing method of claim 8, wherein the data file is divided into a header and a body, the body stores the plurality of captured images and the mask image, and the header stores information of the plurality of captured images and the mask image, and
when the final image is generated and added to the data file, changing the information stored in the header.

13. The image synthesizing method of claim 12, wherein the mask image information comprises mask image feature information stored in the header of the mask image stored in the body, and
the mask image feature information comprises masking section location and size information of the mask image.

14. The image synthesizing method of claim 8, wherein the data file is stored in a non-volatile memory.

* * * * *